No. 781,641. PATENTED FEB. 7, 1905.
S. R. DROWN.
BADGE.
APPLICATION FILED MAY 5, 1904.
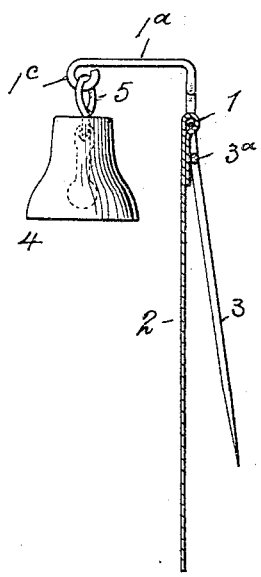
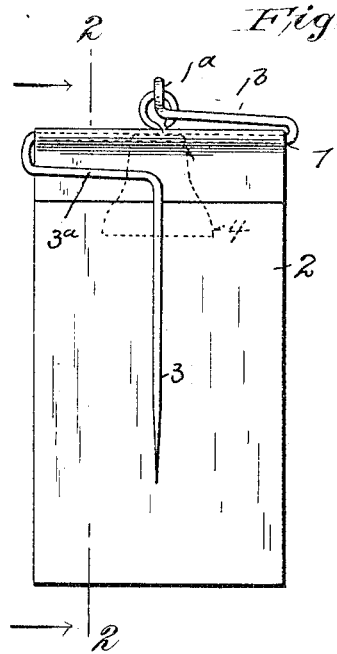

No. 781,641.

Patented February 7, 1905.

UNITED STATES PATENT OFFICE.

SAMUEL R. DROWN, OF NEWARK, NEW JERSEY.

BADGE.

SPECIFICATION forming part of Letters Patent No. 781,641, dated February 7, 1905.

Application filed May 5, 1904. Serial No. 206,466.

*To all whom it may concern:*

Be it known that I, SAMUEL R. DROWN, a citizen of the United States, residing in Newark, Essex county, New Jersey, have invented certain new and useful Improvements in Badges, of which the following is a specification.

My invention has relation to a badge designed particularly for patriotic display; and it comprises a support in the form of a cross-bar having a stem or pin, a flag, ribbon, or the like attached to said bar, and an arm projecting forwardly from said bar, upon which is suspended a bell or the like adapted to hang in front of the flag or ribbon, whereby there is emblematically represented the associated idea of our flag and the Liberty Bell, to be used for patriotic demonstrations and the like.

In the accompanying drawings, Figure 1 is a face view of the rear side of the badge, and Fig. 2 is a section on the line 2 2 in Fig. 1.

The main support I have shown consists of a cross-bar 1, upon which is hung a flag, ribbon, banner, or the like 2, and from said support a stem or pin 3 depends behind the flag or ribbon and is shown provided with a sharp point for insertion in clothing and the like. The support 1 also has an arm projecting forwardly, and, as shown, the arm $1^a$ is located centrally of the badge, from which is hung a bell or other symbol 4. As shown, the arm $1^a$ is connected with a bar $1^b$, bent substantially parallel with the support 1. In the example shown the support 1, its stem or pin 3, the arm $1^a$, and the bar $1^b$ are made of a single piece of wire bent to the appropriate shape, so that the flag or ribbon 2 may be folded over the support 1 to depend therefrom in front of the stem or pin 3, the latter being connected with said support by a bent bar $3^a$, the outer end of the arm $1^a$ being shown bent in the form of an eye or hook $1^c$ to receive the loop 5 of the bell 4. This bell may be made in likeness of the "Liberty Bell" for use in association with the flag.

The badge constructed as above described may be worn in the well-known manner of applying badges upon the person, and by the association together of the flag and bell the patriotic representation of the emblems of our country are associated in a pleasing manner.

Of course instead of a bell any other appropriate symbolic device may be suspended from the arm $1^a$.

Having now described my invention, what I claim is—

1. A badge comprising a supporting-bar provided with a stem or pin, a ribbon carried by said bar, an arm projecting forwardly from said bar, and a bell hung upon said arm in front of the ribbon, substantially as described.

2. A badge comprising a supporting-bar having a portion extending substantially parallel therewith and an arm projecting forwardly therefrom, a ribbon carried by said bar, a stem or pin depending from said bar behind the ribbon and a bell hung upon said bar in front of the ribbon, substantially as described.

SAMUEL R. DROWN.

Witnesses:
T. F. BOURNE,
M. HOLLINGSHEAD.